United States Patent
Singel et al.

(10) Patent No.: US 9,443,222 B2
(45) Date of Patent: Sep. 13, 2016

(54) IDENTIFYING INVENTORY ITEMS IN A STORAGE FACILITY

(71) Applicant: Hand Held Products, Inc., Fort Mill, SC (US)

(72) Inventors: Frank Singel, Cranberry Township, PA (US); William Romantic, Gibsonia, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/513,808

(22) Filed: Oct. 14, 2014

(65) Prior Publication Data

US 2016/0104109 A1    Apr. 14, 2016

(51) Int. Cl.
| | |
|---|---|
| G06F 19/00 | (2011.01) |
| G06Q 10/08 | (2012.01) |
| G06K 19/077 | (2006.01) |
| G06K 19/07 | (2006.01) |

(52) U.S. Cl.
CPC ....... *G06Q 10/0875* (2013.01); *G06K 19/0723* (2013.01); *G06K 19/07705* (2013.01); *G06Q 10/087* (2013.01)

(58) Field of Classification Search
CPC .... B65G 1/1373; B65G 1/137; B65B 61/26; G06K 7/10316; G06K 7/086; G06K 7/10009
USPC ........................................................ 235/385
See application file for complete search history.

(56) References Cited

U.S. PATENT DOCUMENTS

| | | | |
|---|---|---|---|
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 14/274,858 for Mobile Printer With Optional Battery Accessory, filed May 12, 2014, (Marty et al.); 26 pages.

(Continued)

*Primary Examiner* — Thien M Le
*Assistant Examiner* — Claude J Brown
(74) *Attorney, Agent, or Firm* — Additon, Higgins & Pendleton, P.A.

(57) ABSTRACT

Systems and methods for enabling a picker to correctly identify and pick inventory items from a warehouse or storage facility are provided. An exemplary portable picking-assistance device comprises first and second communication devices. The first communication device is configured to electronically receive a first item list including one or more items to be retrieved by an operator from a predetermined storage area. The one or more items may be selected from a plurality of items stored in the predetermined storage area. The second communication device is configured to communicate radio frequency signals to a first radio frequency (RF) tag of a plurality of RF tags. The first RF tag is associated with a first item listed on the first item list. An indication is provided to the operator confirming an identification of the first item to be retrieved by the operator.

22 Claims, 5 Drawing Sheets

(56) References Cited

U.S. PATENT DOCUMENTS

| | | | |
|---|---|---|---|
| 7,726,575 B2 | 6/2010 | Wang et al. | |
| 7,991,654 B1 * | 8/2011 | Sacks | G06F 3/0346 235/462.45 |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,892,240 B1 * | 11/2014 | Vliet | B65G 1/1378 700/213 |
| 8,965,561 B2 * | 2/2015 | Jacobus | G06Q 10/087 700/214 |
| 9,064,226 B2 * | 6/2015 | Waller | G06Q 30/0255 |
| 9,120,622 B1 * | 9/2015 | Elazary | B65G 1/0492 |
| 9,280,756 B2 * | 3/2016 | Hara | G06Q 10/087 |
| 2002/0070862 A1 * | 6/2002 | Francis | G06K 17/00 340/572.1 |
| 2004/0089707 A1 * | 5/2004 | Cortina | G06K 19/0723 235/375 |
| 2005/0071234 A1 * | 3/2005 | Schon | G06Q 10/08 705/22 |
| 2006/0022824 A1 * | 2/2006 | Olsen | B07C 7/005 340/572.1 |
| 2006/0255951 A1 * | 11/2006 | Roeder | B62B 3/06 340/572.7 |
| 2007/0063048 A1 | 3/2007 | Havens et al. | |
| 2007/0080930 A1 * | 4/2007 | Logan | G06Q 10/06 345/156 |
| 2008/0167884 A1 * | 7/2008 | Mountz | G06Q 10/087 705/29 |
| 2008/0185432 A1 | 8/2008 | Caballero et al. | |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2010/0271187 A1 * | 10/2010 | Uysal | G06K 7/0008 340/10.4 |
| 2011/0169999 A1 | 7/2011 | Grunow et al. | |
| 2011/0202554 A1 | 8/2011 | Powilleit et al. | |
| 2011/0315765 A1 * | 12/2011 | Schantz | G01S 13/751 235/385 |
| 2012/0038466 A1 * | 2/2012 | Huang | B65G 1/1373 340/10.42 |

(56) References Cited

U.S. PATENT DOCUMENTS

| | | |
|---|---|---|
| 2012/0111946 A1 | 5/2012 | Golant |
| 2012/0138685 A1 | 6/2012 | Qu et al. |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0025584 A1 | 1/2014 | Liu et al. |
| 2014/0027518 A1 | 1/2014 | Edmonds et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168787 A1 | 6/2014 | Wang et al. |
| 2014/0175165 A1 | 6/2014 | Havens et al. |
| 2014/0175169 A1 | 6/2014 | Kosecki et al. |
| 2014/0175172 A1 | 6/2014 | Jovanovski et al. |
| 2014/0175174 A1 | 6/2014 | Barber |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0291405 A1* | 10/2014 | Harkes ............... G06K 19/0716 235/492 |
| 2014/0350717 A1* | 11/2014 | Dagle ................. B65G 1/1373 700/216 |
| 2015/0081088 A1* | 3/2015 | Lyon .................. G06Q 10/0875 700/216 |
| 2015/0169915 A1* | 6/2015 | Petre .................. G06K 19/0702 340/10.6 |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader, filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

(56) References Cited

OTHER PUBLICATIONS

U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 29/492,903 for an Indicia Scanner, filed Jun. 4, 2014 (Zhou et al.); 23 pages.
U.S. Appl. No. 29/494,725 for an In-Counter Barcode Scanner, filed Jun. 24, 2014 (Oberpriller et al.); 23 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. 14/339,708 for Laser Scanning Code Symbol Reading System, filed Jul. 24, 2014 (Xian et al.); 39 pages.
U.S. Appl. No. 14/379,057 for Method of Using Camera Sensor Interface to Transfer Multiple Channels of Scan Data Using an Image Format filed Aug. 15, 2014 (Wang et al.); 28 pages.
U.S. Appl. No. 14/283,282 for Terminal Having Illumination and Focus Control filed May 21, 2014 (Liu et al.); 31 pages.
U.S. Appl. No. 13/367,978, filed Feb. 7, 2012, (Feng et al.); now abandoned.
U.S. Appl. No. 14/376,472, for an Encoded Information Reading Terminal Including HTTP Server filed Aug. 4, 2014, (Lu); 30 pages.
U.S. Appl. No. 13/771,508 for an Optical Redirection Adapter, filed Feb. 20, 2013 (Anderson); 26 pages.
U.S. Appl. No. 14/340,716 for an Optical Imager and Method for Correlating a Medication Package With a Patient, filed Jul. 25, 2014 (Ellis); 26 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/370,267 for Industrial Design for Consumer Device Based Scanning and Mobility, filed Jul. 2, 2014 (Ma et al.); 45 pages.
U.S. Appl. No. 14/336,188 for Method of and System for Detecting Object Weighing Interferences, Filed Jul. 21, 2014 (Amundsen et al.); 34 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/462,801 for Mobile Computing Device With Data Cognition Software, filed on Aug. 19, 2014 (Todeschini et al.); 38 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/277,337 for Multipurpose Optical Reader, filed May 14, 2014 (Jovanovski et al.); 59 pages.
U.S. Appl. No. 14/300,276 for Method and System for Considering Information About an Expected Response When Performing Speech Recognition, filed Jun. 10, 2014 (Braho et al.); 31 pages.
U.S. Appl. No. 14/460,829 for Encoded Information Reading Terminal With Wireless Path Selecton Capability, filed Aug. 15, 2014 (Wang et al.); 40 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/460,387 for Apparatus for Displaying Bar Codes From Light Emitting Display Surfaces filed Aug. 15, 2014 (Van Horn et al.); 40 pages.
U.S. Appl. No. 14/310,226 for Autofocusing Optical Imaging Device filed Jun. 20, 2014 (Koziol et al.); 28 pages.
U.S. Appl. No. 14/305,153 for Indicia Reading System Employing Digital Gain Control filed Jun. 16, 2014 (Xian et al.); 53 pages.
U.S. Appl. No. 14/327,722 for Customer Facing Imaging Systems and Methods for Obtaining Images filed Jul. 10, 2014 (Oberpriller et al,); 39 pages.
U.S. Appl. No. 14/329,303 for Cell Phone Reading Mode Using Image Timer filed Jul. 11, 2014 (Coyle); 22 pages.
U.S. Appl. No. 14/370,237 for Web-Based Scan-Task Enabled System and Method of and Apparatus for Developing and Deploying the Same on a Client-Server Network filed Jul. 2, 2014 (Chen et al.); 65 pages.
U.S. Appl. No. 14/333,588 for Symbol Reading System With Integrated Scale Base filed Jul. 17, 2014 (Barten); 59 pages.

(56) References Cited

OTHER PUBLICATIONS

U.S. Appl. No. 14/446,387 for Indicia Reading Terminal Processing Plurality of Frames of Image Data Responsively to Trigger Signal Activation filed Jul. 30, 2014 (Wang et al.); 76 pages.

U.S. Appl. No. 14/446,391 for Multifunction Point of Sale Apparatus With Optical Signature Capture filed Jul. 30, 2014 (Good et al.); 37 pages.

* cited by examiner

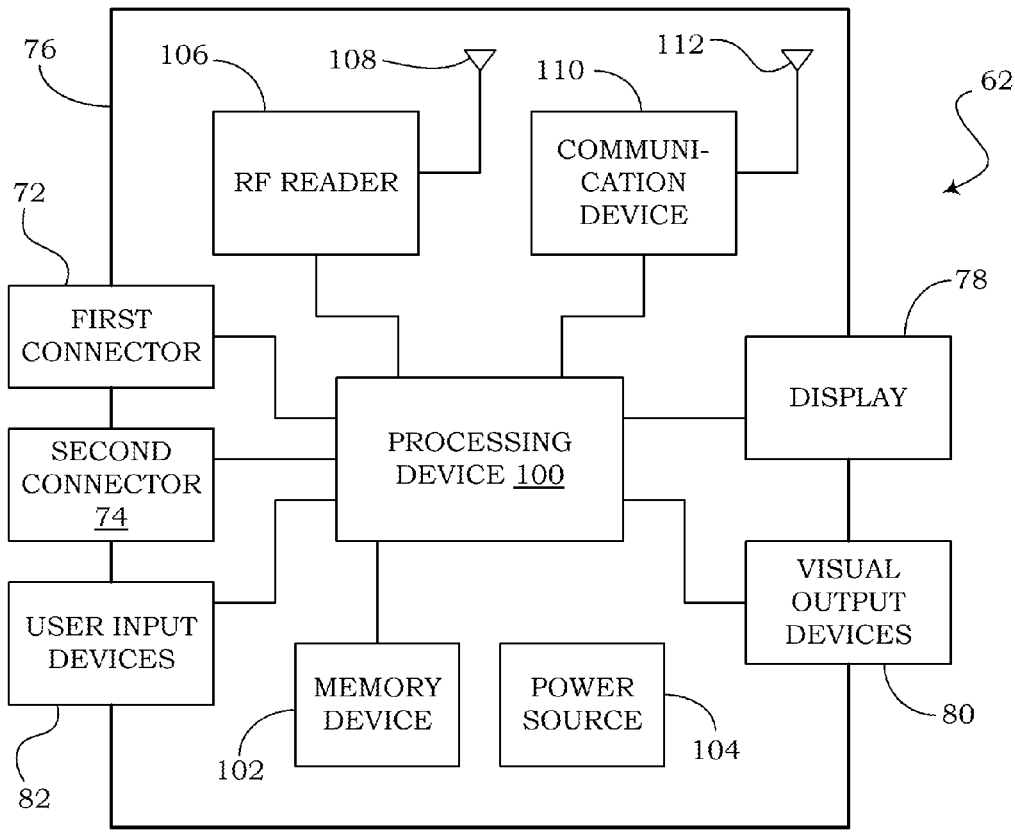
FIG. 4B
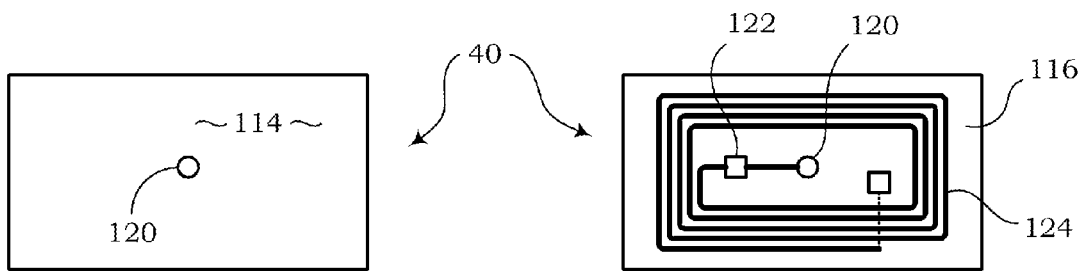
FIG. 5A  FIG. 5B

IDENTIFYING INVENTORY ITEMS IN A STORAGE FACILITY

FIELD OF THE INVENTION

The present invention relates to the process of picking, or retrieving, items from a storage area.

BACKGROUND

In a warehouse setting or other similar setting, goods are often stored on shelves of rack structures in an organized manner for later retrieval. When a purchasing order or shipping order is received, a picker travels throughout the warehouse to retrieve the item or items listed on the order form. The picked items can then be packed, shipped, or delivered to a customer.

An organizational system is used in such a storage facility to identify the inventory items and the location of those items within the facility. Often, information is printed on a product sheet (e.g., a paper form or card) that is attached to the racks where the items are stored. The picker can then match information on the product sheet (or information on the inventory item itself) with information on the order form.

For example, FIG. 1 shows a conventional system 10 for identifying stored items in a storage facility. The conventional system 10 includes a rack structure 12 for supporting a plurality of items. The rack structure 12 includes a framework consisting of vertical supports 14 and shelves 16. The rack structure 12 may be configured to support a plurality of bins 18, which are placed on the shelves 16. The bins 18 are usually configured to store small items. Larger items may be more easily stored without the use of bins 18. The bins 18 may have various sizes and shapes as needed to contain one or more items of a specific type. In order to identify the various items, the system 10 includes product sheets 20 or other printed material. The product sheets 20 may be attached to the rack structure 12 on the vertical supports 14 and/or the shelves 16 in the vicinity of the specific items. The product sheets 20 may also be attached to the bins 18.

Although the product sheets 20 are meant to ensure that the correct items are picked, a large number of picking errors still occurs. One reason for the errors may be that pickers in such a system are required to visually observe three things at about the same time (i.e., the product information on the order form, the corresponding product information on the product sheet, and the product itself). Pickers may get distracted or read information incorrectly, leading to errors.

Voice-directed picking is a method that uses audio instructions for directing the picker to pick the correct items. For example, the picker may wear a headset that is connected to a portable computer device. By adding audio instructions to the picking process, the picker has one less thing to visually observe. In addition, the headset may include a microphone that allows the picker to provide feedback to confirm that the correct item was picked. For example, the picker may read back some of the information printed on the product sheets 112, such as a number of check-digits. One issue that may cause picking errors using voice-directed picking, however, is that a picker might memorize the check-digits for some of the common items and attempt to speak the check-digits from memory. In other cases, a picker may simply read the check-digits incorrectly.

As a result of picking errors, incorrect items may be shipped to the customers, leading to inventory inaccuracies. Also, extra time is needed to correct any issues, which is a waste of personnel time. Furthermore, incorrect picking may also lead to customer dissatisfaction.

Therefore, a need exists for improving the way in which items are retrieved or picked from a warehouse or storage facility. The present invention provides systems and methods that improve upon the item-picking processes already in existence in order to attempt to further reduce the number of picking errors.

SUMMARY

Accordingly, in one aspect, the present invention encompasses a warehouse management system. According to one exemplary embodiment, the warehouse management system comprises a host computer, a plurality of radio frequency (RF) tags, and a portable electronic device. The RF tags are associated with a plurality of items stored in a predetermined storage area. The portable electronic device is configured to receive a first item list from the host computer, the first item list including one or more items to be retrieved from the predetermined storage area by a picker. The portable electronic device is configured to communicate with a first RF tag of the plurality of RF tags. The first RF tag is associated with a first item included in the first item list. An indication is provided to the picker confirming an identification of the first item to be retrieved by the picker.

In another exemplary embodiment, a portable picking-assistance device comprises first and second communication devices. The first communication device is configured to electronically receive a first item list including one or more items to be retrieved by an operator from a predetermined storage area. The one or more items are selected from a plurality of items stored in the predetermined storage area. The second communication device is configured to electronically communicate radio frequency signals to a first radio frequency (RF) tag of a plurality of RF tags. The first RF tag is associated with a first item listed on the first item list. An indication is provided to the operator confirming an identification of the first item to be retrieved by the operator.

In yet another exemplary embodiment, an item identifying device comprises a radio frequency (RF) tag and an indicator. The RF tag is associated with a first item of a plurality of items stored in a storage facility. The RF tag is configured to receive RF signals within a first RF frequency range of a plurality of RF frequency ranges. The indicator is configured to provide an indication to an item picker to confirm an identification of the first item when RF signals within the first RF frequency range are received by the RF tag.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 4B illustrates a block diagram of the portable picking-assistance device of FIG. 4A.

FIG. 5A illustrates a front view of an embodiment of a radio frequency (RF) tag according to the present invention.

FIG. 5B illustrates a back view of the RF tag of FIG. 5A.

DETAILED DESCRIPTION

The present invention is directed to systems and methods for assisting a picker in the process of picking inventory items from a storage area. Recently, voice-assisted picking has been developed in the field of inventory management to reduce errors in the handling of items stored within a warehouse or other storage facility. The present invention provides further assistance to a picker by identifying an item to be picked and producing an indication (e.g., visual, audible, or both) to the picker to confirm which item is the correct item to be picked.

Specifically, radio frequency (RF) tags can be placed on the items or on parts of the storage area in the vicinity of the items. Preferably, the RF tags may communicate with portable RF readers using the Bluetooth® (a short-range wireless communication protocol) Low Energy (BLE) wireless communications protocol. Alternatively, the RF tags may be radio frequency identification (RFID) tags and receive signals from portable RFID readers. Each RF tag within the storage area may be given a unique identification (e.g., unique frequency characteristics) to identify the corresponding item. When the picker carries an RF reader into the vicinity of the item to be picked, the RF reader communicates with the RF tag that corresponds with the respective item. The RF reader stores information, such as in the form of a table, which correlates the item, the unique identification of the RF tag associated with the item, and the location of the RF tag (and ultimately the item) within the storage facility.

Figure 1:
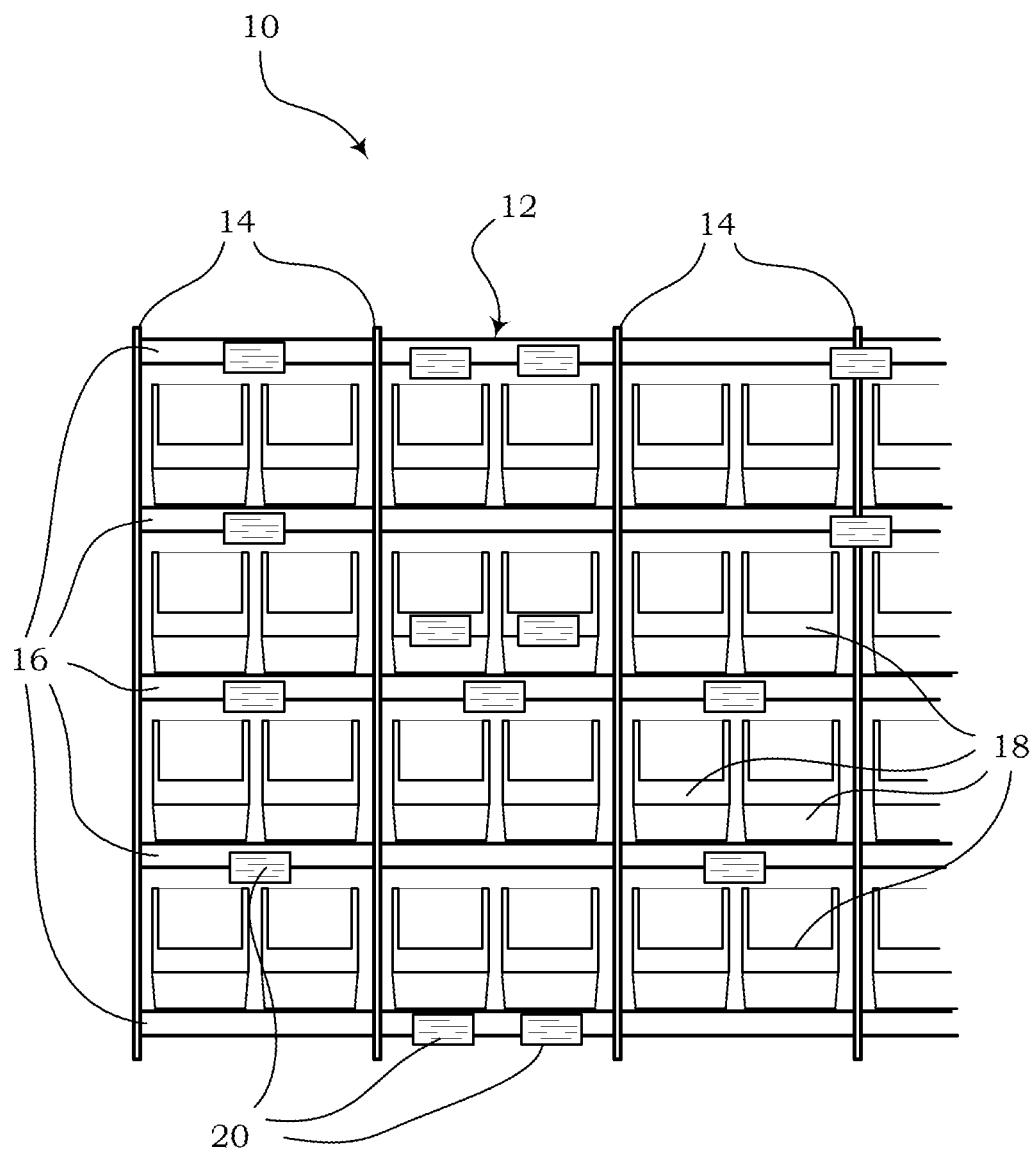
FIG. 1 illustrates a front view of a conventional item identifying system.
Figure 2:
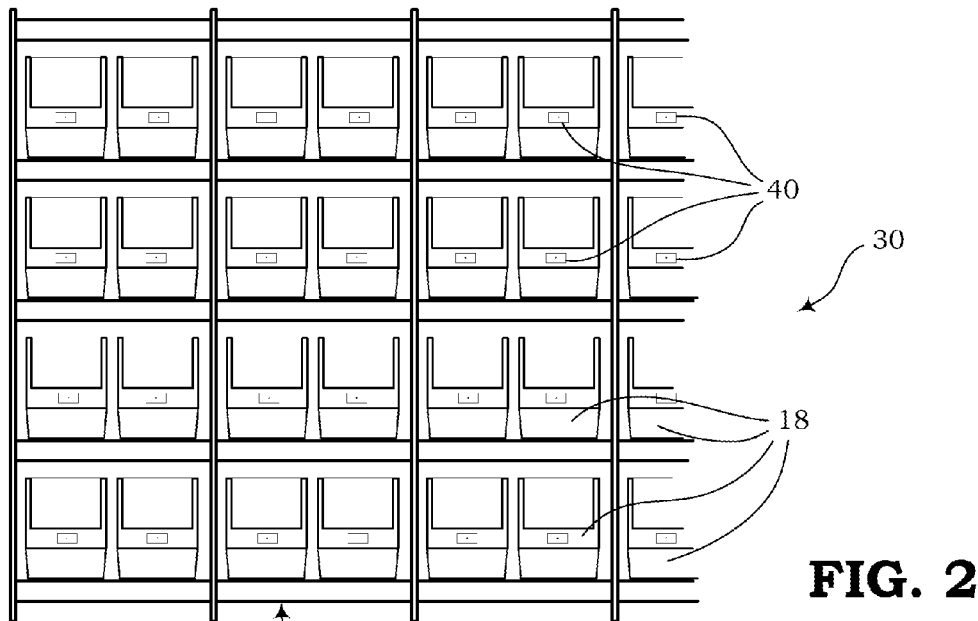
FIG. 2 illustrates a front view of a first embodiment of an item identifying system according to the present invention.

FIG. 2 shows an item identifying system 30 according to an exemplary embodiment. The item identifying system 30 of FIG. 2 may include the same rack structure 12 and bins 18 as described with respect to FIG. 1. However, instead of the paper-based product sheets 20 used in the conventional systems, the item identifying system 30 of FIG. 2 includes radio frequency (RF) tags 40 attached to the bins. The RF tags 40 may be BLE tags, RFID tags, or other suitable low energy wireless tags. Each bin 18 is configured to store one type of item therein. Thus, when an identification is made with a bin 18 corresponding to an item to be picked, an indication is provided to the picker as to which item is to be picked. The RF tags 40 may include any suitable type of adhesive material to allow the RF tags 40 to be adhered to the bins 18. For example, a back surface of the RF tags 40 may include a glue-type substance for adhesion to the bins 18.

Figure 3:
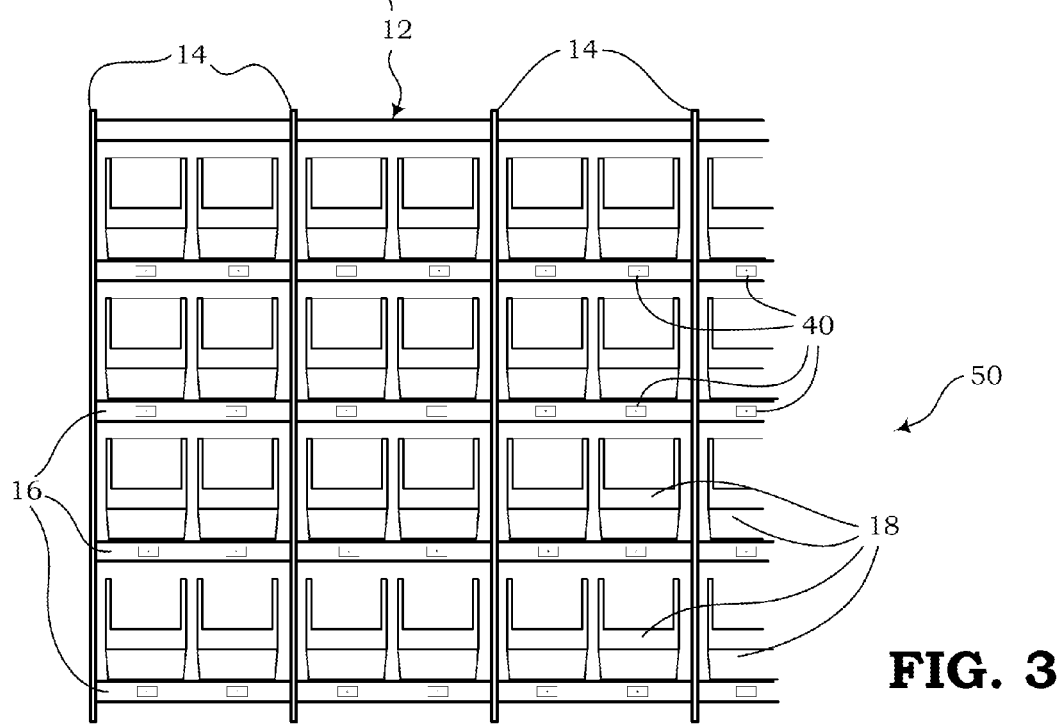
FIG. 3 illustrates a front view of a second embodiment of an item identifying system according to the present invention.

FIG. 3 shows a second embodiment of an item identifying system 50. The item identifying system 50 of FIG. 3 may also include the same rack structure 12 and bins 18 as described with respect to FIGS. 1 and 2. Similar to the embodiment of FIG. 2, but unlike the embodiment of FIG. 1, the item identifying system 50 of FIG. 3 includes RF tags 40. However, the RF tags 40 in this embodiment are placed on the rack structure 12. The RF tags 40 may be placed on either or both of the vertical supports 14 and shelves 16. The RF tags 40 may include any suitable adhesion material, such as glue, tape, Velcro, etc., for attaching to the rack structure 12.

In the embodiments of FIGS. 2 and 3, the RF tags 40 may be placed on the vertical supports 14, shelves 16, bins 18, or other parts of the storage infrastructure in proximity to the items being identified. For certain larger items, bins may not be needed and the items may be placed directly on one of the shelves 16 or on the ground under the shelves 16. In this case, the RF tag 40 may be placed on the item itself or on parts of the rack structure 12.

Figure 4A:
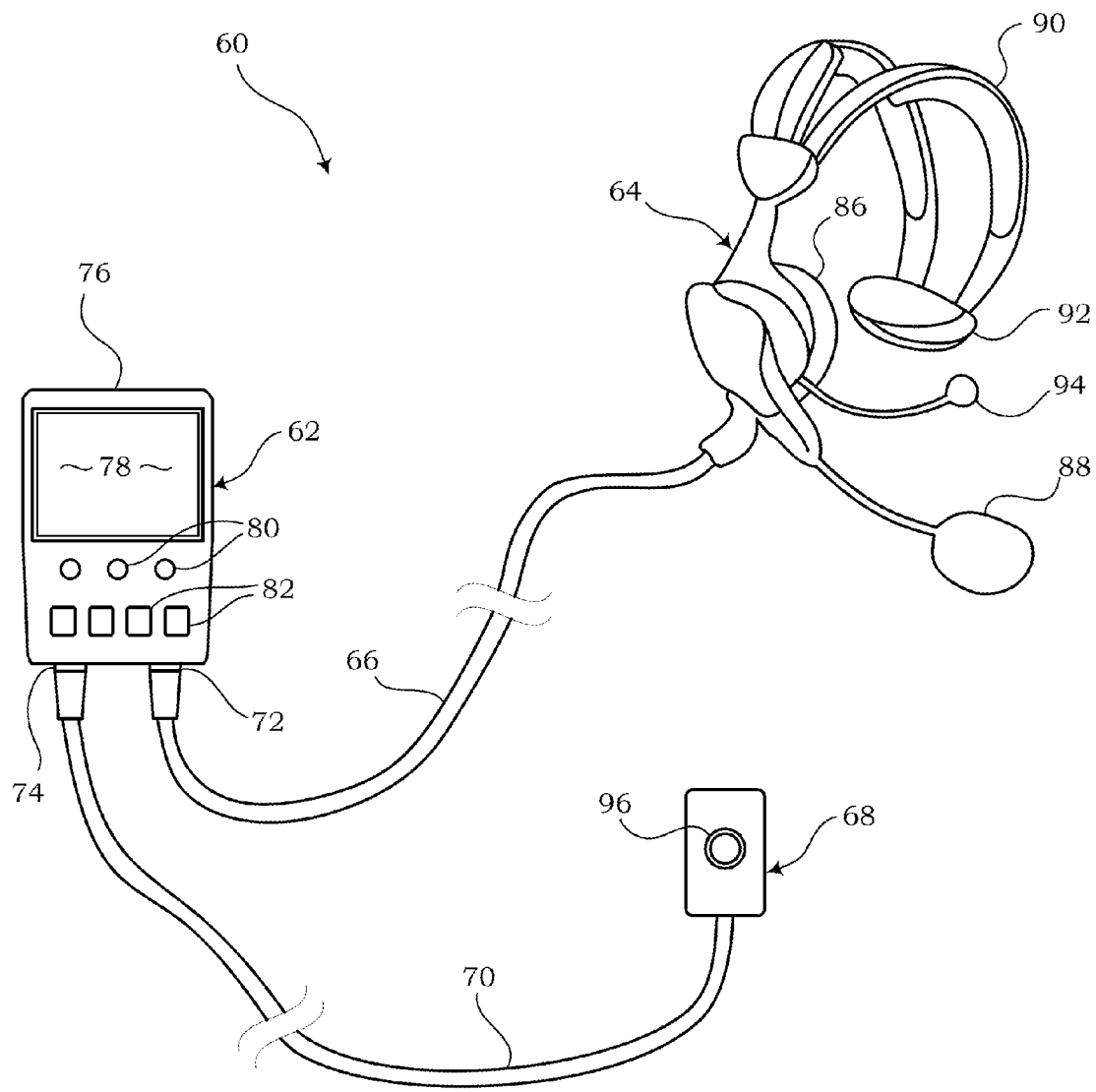
FIG. 4A illustrates an embodiment of a portable picking-assistance device according to the present invention.

FIG. 4A shows an embodiment of a portable picking-assistance device 60, which is configured to be carried or worn by a picker. According to the embodiment shown in FIG. 4A, the portable picking-assistance device 60 includes a portable computer device 62, a headset 64 connected to the portable computer device 62 via a first cable 66, and a proximity unit 68 connected to the portable computer device 62 via a second cable 70.

The proximity unit 68 and second cable 70 may be considered optional and may be omitted in some embodiments. According to other implementations, the proximity unit 68 may communicate with the portable computer device 62 via a wireless channel (e.g., Bluetooth® (a short-range wireless communication protocol) channel) to reduce the possibility of interference of the second cable 70 with a picker's hands and arms. With wireless communication, the second cable 70 may be omitted.

The portable computer device 62 includes a first connector 72, or interface, for coupling with the first cable 66 and a second connector 74, or interface, for coupling with the second cable 70. The portable computer device 62 may include at least a housing 76, a display 78, visual output devices 80 (e.g., LEDs), and user input devices 82 (e.g., keypad or buttons).

The headset 64 includes one or more audio output devices 86 (e.g., speakers or ear pieces), audio input device 88 (e.g., microphone), one or more support straps 90, and padding 92. According to some embodiments described in the present disclosure, the headset 64 may further include a visual indicator 94. The visual indicator 94 may be a light (e.g., LED) for providing a visual indication to the picker when certain conditions are met, as explained in more detail below.

The headset 64, however, may be optional according to some of the embodiments of the present invention. In other embodiments, the headset 64 may communicate with the portable computer device 62 via a wireless channel (e.g., Bluetooth® (a short-range wireless communication protocol) channel), whereby the first cable 66 can be omitted, thereby eliminating any possible interference that the first cable 66 may have with the picker's arms or hands.

The headset 64 may be used in a voice-directed picking process for enabling a user (i.e., the picker) to receive audible picking instructions and to respond with voice commands. The portable computer device 62 may include voice recognition software and picking assistance software to be used in cooperation with the headset 64, allowing the portable computer device 62 to provide audible picking instructions to the picker and receive audible responses from the picker. Furthermore, the headset 64 may be configured to provide audible signals to the user to indicate when an item is correctly or incorrectly identified. For example, when an item is identified by its corresponding RF tag 40, certain tones can be produced through the audio output device 86 to indicate whether the item is the correct item to be picked or an incorrect one.

The portable computer device 62 may have a clip, clamp, or other suitable fixing unit (not shown) for attaching the portable computer device 62 to the picker. For example, the fixing unit may attach the portable computer device 62 on a pocket of a garment, on pants, or on a belt worn by the picker.

The headset 64 is worn on the picker's head with the audio output device 86 against the picker's ear and the audio input device 88 near the front of the picker's mouth. The visual indicator 94 may be positioned near the temple of the picker's head within a peripheral view of the picker.

The proximity unit 68 may include a strap with a suitable size-adjustment connection (e.g., Velcro, button, snap, etc.) to allow the picker to wear the proximity unit 68 on his or her arm, wrist, hand, finger, or thumb. In some embodiments, the proximity unit 68 may be incorporated into a glove or sleeve worn by the picker.

The portable computer device 62 is configured to store a list of items to be picked by the picker. For example, using wireless communication in the general vicinity of a warehouse computer, the portable computer device 62 may receive the item list and store it in memory. Using voice software, the portable computer device 62 may provide instructions to the picker regarding information related to the first item to be picked. The instructions may be shown on the display 78, may be audibly expressed through the audio output device 86 using voice commands or tonal commands, or may be indicated in other suitable ways. The instructions may include the name of the item to be picked, a product number or other reference characters corresponding to the item, a location of the item, directions of how the picker is to get to the item's location, etc.

According to the teachings of the present invention, the portable picking-assistance device 60 further enables the picker by providing assistance when the picker enters an area near the item to be picked. The portable picking-assistance device 60, in cooperation with the RF tags 40, is able to provide an indication to the picker confirming the location of the associated RF tag 40, and thereby the item to be picked. The indication can be provided in one or more ways according to various embodiments of the present invention.

In one embodiment, the RF tag 40 may include an LED that is configured to illuminate upon receipt of an RF signal from the portable computer device 62. The RF tag 40 may be a passive element and may include no power source. Instead, the electromagnetic field of the RF signal from the portable computer device 62, when within range of the RF tag 40, is sufficient to power the LED for a short duration. In this embodiment, the picker will be able to see the LED illuminated from the RF tag 40 and pick the corresponding item.

In another embodiment, a proximity sensor may be incorporated into the portable picking-assistance device 60. For example, the proximity sensor may be contained with the portable computer device 62, or, more preferably, within the proximity unit 68. When the picker places his or her hand near the corresponding RF tag 40, the proximity unit 68 may illuminate the light 96 on the proximity unit 68, indicating the correct item to be picked. In some embodiments, the proximity sensor of the proximity unit 68 may be used to trigger the illumination of the LED on the RF tag 40. This provides an indication to the picker to confirm that an item near the hand of the picker is the correct item to be picked. In some embodiments, the proximity unit 68 may include an additional light, such as a red light, which illuminates when the item near the picker's hand is not the correct item to be picked.

Another way that the portable picking-assistance device 60 can provide a visual indication to the picker to confirm that the item to be picked is the correct item is by illuminating the visual indicator 94 on the headset 64 or by illuminating a visual output device 80 on the portable computer device 62. Visual indications may be provided on any one or more of the RF tag 40, proximity unit 68, headset 64, and/or portable computer device 62.

In addition, other types of indicators can be provided to the picker to verify the correct item is being picked. For example, the portable computer device 62 may provide an audio signal (e.g., voice instructions or specific tones) to the audio output device 86 of the headset 64. Any combination of visual indications, as mentioned above, and audible indications can be implemented to further enhance the picking process.

FIG. 4B is a block diagram illustrating an embodiment of circuitry contained within the housing 76 of the portable computer device 62 shown in FIG. 4A. In this embodiment, the portable computer device 62 includes a processing device 100, memory device 102, power source 104 (e.g., batteries), RF reader 106, first antenna 108, communication device 110, and second antenna 112.

The processing device 100 is configured to control the overall operations of the portable computer device 62 and any peripheral devices (e.g., headset 64 and proximity unit 68). The power source 104 is configured to provide power to the circuit elements of the portable computer device 62 and any peripheral devices (e.g., the headset 64 and proximity unit 68).

According to some embodiments, the RF reader 106 and communication device 110 may be combined into one communication unit that performs the operations of both. Also, in other embodiments, the RF reader 106 and communication device 110 may share a single antenna. The portable computer device 62 may include more or fewer communication modules for wireless communication with the headset 64 and/or wireless communication with the proximity unit 68 in certain embodiments.

The user input devices 82 allow the user to provide input into the portable computer device 62. The display 78 and visual output devices 80 provide visual outputs to the user. For example, the visual output devices 80 may include one or more lights, such as light emitting diode (LED) elements. The portable computer device 62 may be configured to control the visual output devices 80 to indicate when a specific RF tag 40 is within wireless communication range. The portable computer device 62 may also provide either or both of audio signals and visual signals to the headset 64 via the first connector 72. Signals received by the headset 64 may be audio signals and/or visual signals, wherein the audio signals are output through the audio output device 86 and the visual signals are output via the visual indicator 94. Additionally, the portable computer device 62 may also provide signals to the proximity unit 68 via the second connector 74 to allow the proximity unit 68 to output visual signals through the LED 96.

The memory device 102 may include one or more suitable memory elements having any combination of volatile and non-volatile memory. Picking software may be stored in the memory device 102 for assisting the picker with the picking process, as explained herein. The picking software may be stored on a non-transitory computer-readable medium. In some embodiments, picking programs may be stored in software, hardware, and/or firmware.

The RF reader 106 is configured to transmit and receive RF signals via the antenna 108. The RF reader 106 may be configured to operate within a range between 2.400 GHZ and 2.484 GHz in order to operate within the Bluetooth® (a short-range wireless communication protocol) or Bluetooth® (a short-range wireless communication protocol) Low Energy (BLE) protocols. According to other embodiments, the RF reader 106 may be configured to operate at various frequencies within a range between 902 MHZ and 928 MHz in order to operate within a spectrum for use with passive RFID tags. To operate within the classic Bluetooth® (a short-range wireless communication protocol) and BLE protocols, the antennas and integrated circuits of the RF tags 40 (e.g., either passive or active RF tags) may be designed to operate at specific frequencies providing a unique identification that is different from the other RF tags 40. With respect to embodiments in which the RF tags 40 are active and/or battery-powered, the RF reader 106 may be designed to communicate within the specific frequency range of the RF tags 40. The memory device 102 may store a table that relates each RF tag 40 with the corresponding item and the location of the item.

In some embodiments, the RF reader 106 may instead be incorporated in the proximity unit 68 to shorten the range of transmission and reception when the picker extends his or her hand toward the item to be picked. As such, the RF reader 106 and RF tag 40 can communicate in a close range (e.g., within a few inches) to confirm identity. Other ranges and power levels of the RF reader 106 may be used depending on the particular application. For example, if RF tags 40 are closely spaced from each other, a shorter transmission range may be desirable to better pinpoint the location of the item to be picked.

Based on the frequency of the RF tag 40 corresponding to the item to be picked, the processing device 100 configures the RF reader 106 to transmit and receive signals at the specific frequency of the desired RF tag 40 so that only the correct RF tag 40 reacts to the interrogation signal from the RF reader 106.

In some warehouses, the number of different types of items may be too great to allow each corresponding RF tag 40 to have a unique frequency. In this case, frequencies can be shared by items in different sections of the warehouse without causing confusion.

FIGS. 5A and 5B illustrate an embodiment of the RF tag 40 shown in FIGS. 2 and 3. FIG. 5A shows a first side 114 of the RF tag 40 and FIG. 5B shows a second side 116 of the RF tag 40. The first side 114 may contain a flexible substrate and may be configured to face outward away from the rack structure 12 or bins 18. The first side 114 may include blank areas where information describing the characteristics of the RF tag 40 and/or item can be printed. According to some implementations, the first side 114 may include an aperture that is configured to expose an LED 120.

The LED is part of an RF circuit as shown in FIG. 5B, which includes the LED 120, an integrated circuit 122, and a serpentine antenna 124. Also, an adhesive material may be applied around the outer edge of the second side 116 of the RF tag 40 to allow the RF tag 40 to be attached to a bin 18 or part of the rack structure 12.

The RF circuit may be designed to operate in any suitable frequency range at any specific frequency in coordination with the overall design of the warehouse management system. Particularly, each RF tag 40 is configured to have a unique frequency such that one RF tag 40 can be distinguished from another. When the RF reader 106 of the portable computer device 62 transmits an interrogation signal at a particular frequency, only the corresponding RF tag 40 reacts to the signal and provides a response signal back to the RF reader 106.

Figure 6:
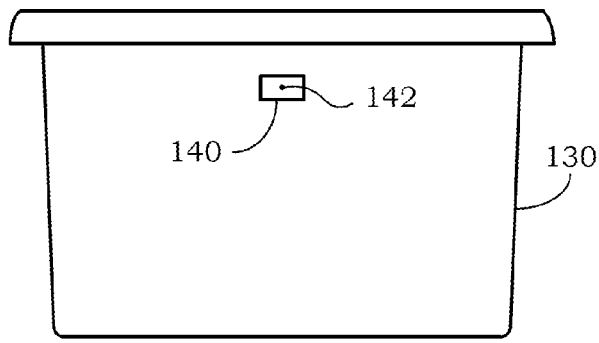
FIG. 6 illustrates a side view of a tote according to the present invention.

FIG. 6 shows a side view of a tote 130 according to one embodiment. The tote 130 may have any suitable structural design regarding size, shape, handles, materials, etc. Preferably, the tote 130 includes a hard plastic material and has a substantially square or rectangular box shape. The design of the tote 130 allows a picker to carry the tote 130 throughout the warehouse and allows the picker to place picked items inside the tote 130. The tote 130 can be a specifically designed device or a pre-existing tote used for other purposes and modified to be used with the RF technology described herein.

A second type of RF tag 140 may be attached to any suitable part of the tote 130. Preferably, the RF tag 140 can be attached to one of the sides, one of the ends, on one of the handles, on a cover (when included) of the tote 130, or on a top rim of the tote 130. The RF tag 140 may be similar in design and functionality to the RF tag 40 described with respect to FIGS. 5A and 5B and include a unique frequency to distinguish one tote 130 from another. In the embodiment of FIG. 6, the RF tag 140 includes an LED 142.

Applying the RF tag 140 to tote 130 allows the tote to be identified when an item on a particular list has been picked and is intended to be kept together with other items on the particular list. Multiple totes 130 may be transported throughout a warehouse to enable a picker to pick items on multiple lists. A first list of items may correspond to one customer while a second list may correspond to another customer. To keep the items separated, the picker in this situation may transport two totes 130 throughout the storage facility. In order to confirm that the picker places the item into the correct tote 130, an indication is provided on the tote 130 (e.g., LED 142) to indicate the corresponding tote 130 in which to place the item. The indication using LED 142 may be provided at the same time or after other indications as mentioned before are provided.

According to various embodiments of the present invention, the RF tag 140 is configured to be in communication with the RF reader 106 of the portable computer device 62. When a picker is in the process of picking an item or has already picked the item, the RF reader 106 may provide a second RF signal for identifying the correct tote 130 in which to put the picked item.

Figure 7:
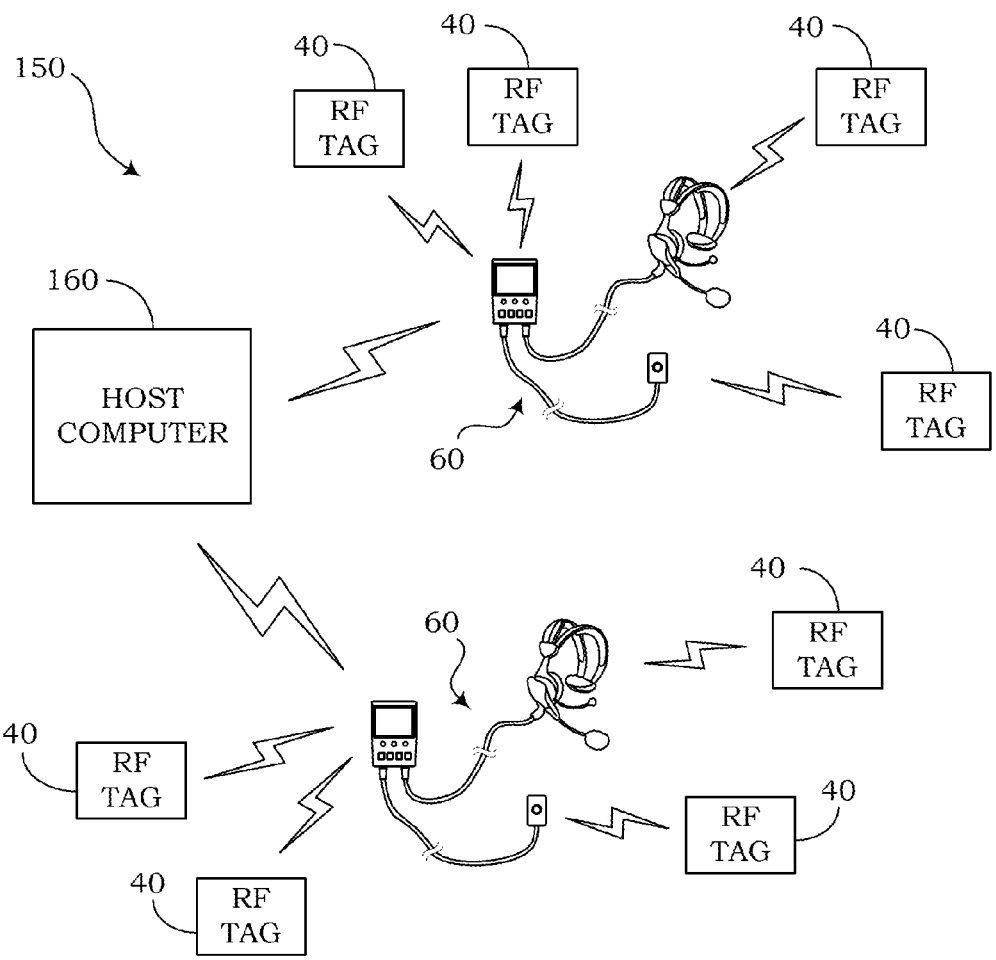
FIG. 7 illustrates a schematic diagram of an embodiment of a warehouse management system according to the present invention.

FIG. 7 is a block diagram illustrating a warehouse management system 150 according to one implementation. The warehouse management system 150 includes a host computer 160, one or more portable picking-assistance devices 60, and one or more RF tags 40, 140. The one or more portable picking-assistance devices 60 are carried or worn by one or more pickers.

When a picker comes within range of the host computer 160, the host computer 160 transmits an item list to the picker's portable picking-assistance device 60. For example, the communication device 110 of the respective portable picking-assistance device 60 may be used for communicating with the host computer 160. The item list may include one or more items to be picked. The item list may also include information regarding any product numbers corresponding to the items, the quantity of each item to be picked, the location of the items, etc. When the list is received, the picker can then travel throughout the warehouse to retrieve the items. In some embodiments, audio instructions are provided to the picker to direct him or her to the items.

The RF reader 106 continually transmits the RF interrogation signal and waits for a response. When the picker comes within a certain range of the item and approaches near a rack where the item is stored, the RF tag 40 that is able to receive the interrogation signal sends a reply back to the RF reader 106. Also, an indication is provided to the picker that can be in the form of a visual indication or audible indication. Visual indications may be provided by any one or more of the RF tags 40, 140, proximity unit 68, visual indicator 94 on the headset 64, visual output devices 80 on the portable computer device 62. Audible indications may be provided by the audio output device 86 of the headset 64.

To supplement the present disclosure, this application incorporates entirely by reference the following patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;

U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTIPURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTO-FOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Reublinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.) and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A warehouse management system comprising:
a host computer;
a plurality of radio frequency (RF) tags associated with a plurality of items stored in a predetermined storage area;
a portable electronic device configured to receive a first item list from the host computer, the first item list including one or more items to be retrieved from the predetermined storage area by a picker; and
a plurality of totes, each tote configured to accompany a picker and to carry one or more picked items;
wherein the portable electronic device is configured to communicate with a first RF tag of the plurality of RF tags, the first RF tag associated with a first item included in the first item list; and
wherein the portable electronic device is configured to, in response to communicating with the first RF tag, provide an indication to the picker confirming an identification of the first item to be retrieved by the picker; and
wherein each tote includes a portable RF tag configured to communicate with the portable electronic device, and wherein each tote includes an indicator configured to provide a second indication confirming an identification of the respective tote in which an identified item is carried.

2. The warehouse management system according to claim 1, wherein the RF tags are attached to a plurality of bins associated with the plurality of items, and wherein each bin is configured to store one or more items of a particular type.

3. The warehouse management system according to claim 2, wherein the host computer is configured to store information relating each of the plurality of RF tags with a corresponding one of the plurality of bins.

4. The warehouse management system according to claim 1, wherein the RF tags are attached to one or more racks located in the predetermined storage area, each RF tag being positioned on the one or more racks in the vicinity of a corresponding type of item stored on the one or more racks.

5. The warehouse management system according to claim 1, wherein a first tote of the plurality of totes is configured to carry the one or more items listed on the first item list and a second tote of the plurality of totes is configured to carry one or more items listed on a second item list.

6. The warehouse management system according to claim 1, wherein each of the RF tags is coupled with an indicator configured to provide the indication confirming the identification of the first item.

7. The warehouse management system according to claim 6, wherein the indicator is an LED.

8. The warehouse management system according to claim 1, wherein the portable electronic device is connected to a headset including an audio output device and an audio input device, wherein the audio output device is configured to provide audible item-picking directions to the picker, and wherein the audio input device is configured to receive speech recognizable input from the picker.

9. The warehouse management system according to claim 1, wherein the portable electronic device is configured to communicate with the RF tags using a short-range wireless communication protocol.

10. The warehouse management system according to claim 1, wherein the portable electronic device is connected to a proximity unit including one or more indicator devices configured to provide the indication confirming the identification of the first item.

11. The warehouse management system according to claim 10, wherein the proximity unit is configured to detect an RF tag in its vicinity.

12. The warehouse management system according to claim 1, wherein the RF tags are passive RFID tags.

13. A portable picking-assistance device comprising:
a first communication device configured to electronically receive a first item list including one or more items to be retrieved by an operator from a predetermined storage area, the one or more items selected from a plurality of items stored in the predetermined storage area; and
a second communication device configured to electronically communicate radio frequency signals to a first radio frequency (RF) tag of a plurality of RF tags, the first RF tag associated with a first item listed on the first item list;

wherein the second communication device is configured to, in response to communicating with the first RF tag, provide an indication to the operator confirming an identification of the first item to be retrieved by the operator;

wherein the RF tags are attached to at least one of a plurality of bins and a plurality of racks configured to support the plurality of bins, each bin being configured to store a specific type of item; and wherein the second communication device is further configured to communicate with a plurality of portable RF tags attached to a plurality of totes configured to accompany a picker and to carry one or more picked items, wherein each portable RF tag includes an indicator configured to provide a second indication confirming an identification of the respective tote in which an identified item is carried.

14. The portable picking-assistance device according to claim 13, wherein the first communication device is configured to receive the first item list from a host computer of a warehouse management system.

15. The portable picking-assistance device according to claim 13, further comprising a headset and speech recognition software, the headset including an audio output device and an audio input device, wherein the audio output device is configured to provide audible item-picking directions to the operator, and wherein the audio input device is configured to receive speech recognizable input from the operator.

16. The portable picking-assistance device according to claim 13, wherein the second communication device is configured to communicate with the RF tags using a short-range wireless communication protocol.

17. The portable picking-assistance device according to claim 13, further comprising one or more indicator devices configured to provide the indication confirming the identification of the first item, the one or more indicator devices including at least one of a visual output device and an audio output device.

18. The portable picking-assistance device according to claim 17, wherein the one or more indicator devices are coupled to at least one of a headset and a wearable proximity unit.

19. An item identifying device comprising:

a radio frequency (RF) tag associated with a first item of a plurality of items stored in a storage facility, the RF tag configured to receive RF signals within a first RF frequency range of a plurality of RF frequency ranges; and an indicator configured to provide an indication to an item picker to confirm an identification of the first item in response to the RF tag receiving RF signals within the first RF frequency range; and wherein the RF tag is attached to a tote configured to accompany a picker and to carry one or more picked items, and wherein the indicator is configured to provide a second indication confirming an identification of the respective tote in which the first item is carried.

20. The item identifying device according to claim 19, wherein the RF tag is attached to a bin configured to store the first item.

21. The item identifying device according to claim 19, wherein the RF tag is attached to a rack structure in the vicinity of the first item.

22. The item identifying device according to claim 19, wherein the RF tag is a passive RFID device and the indicator is an LED.

* * * * *